S. B. FIELD.
PROCESS OF UNITING TOGETHER PLATES OF METAL BY SWEATING.
APPLICATION FILED DEC. 2, 1915.

1,247,250.

Patented Nov. 20, 1917.
3 SHEETS—SHEET 1.

Witnesses:
Mary McCulloch
John H. Parker

Inventor:
Samuel B. Field
by Macleod, Calver, Copeland & Dike
Attorneys

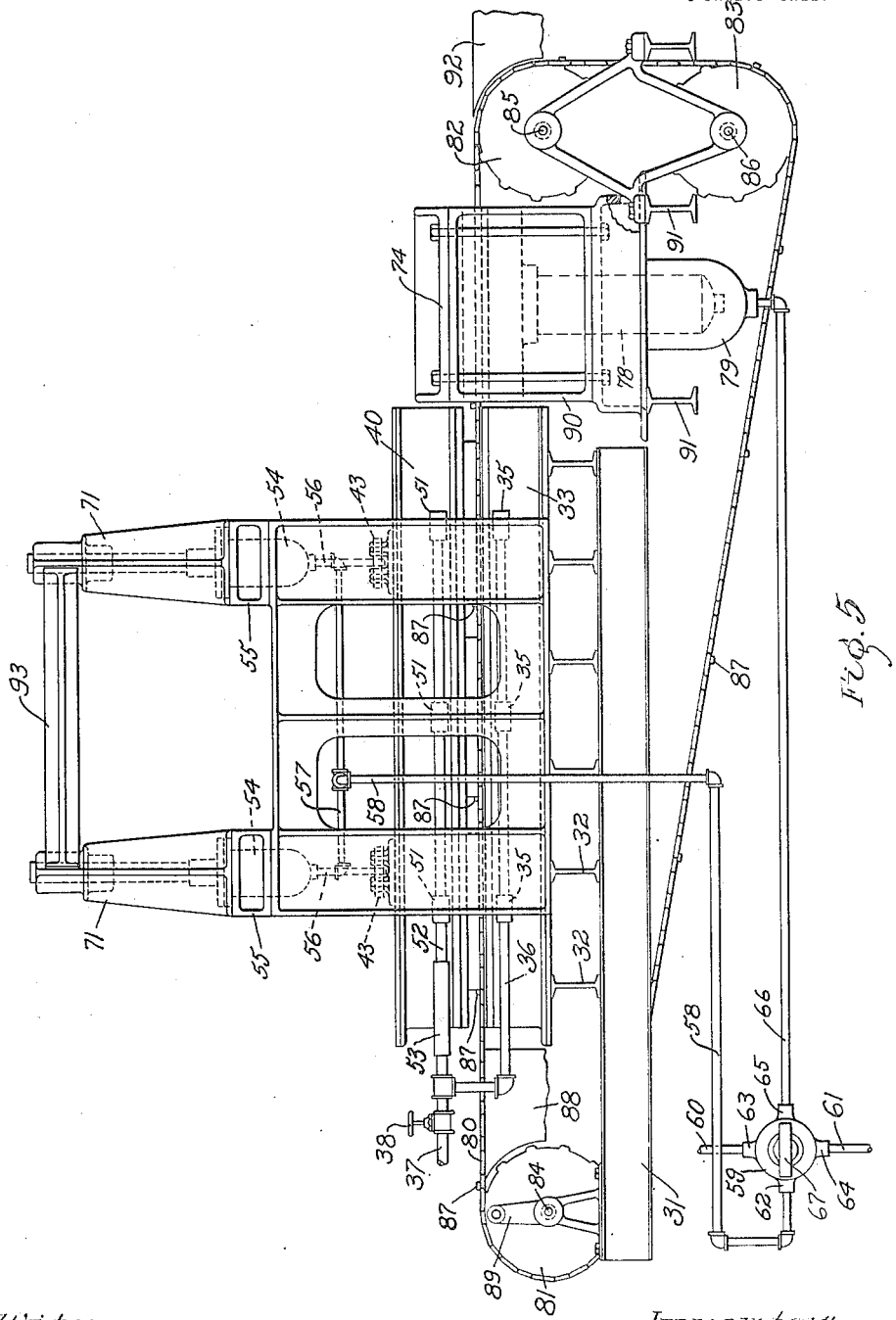

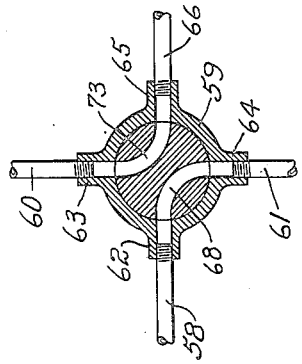
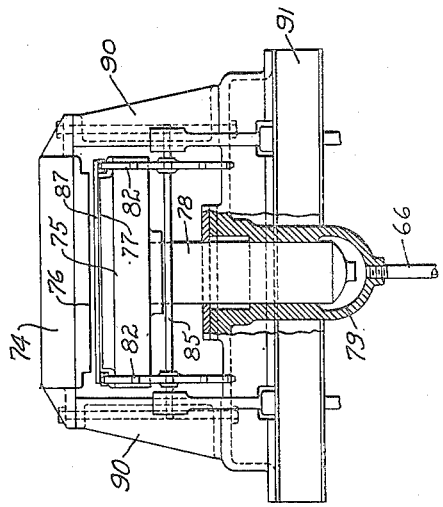
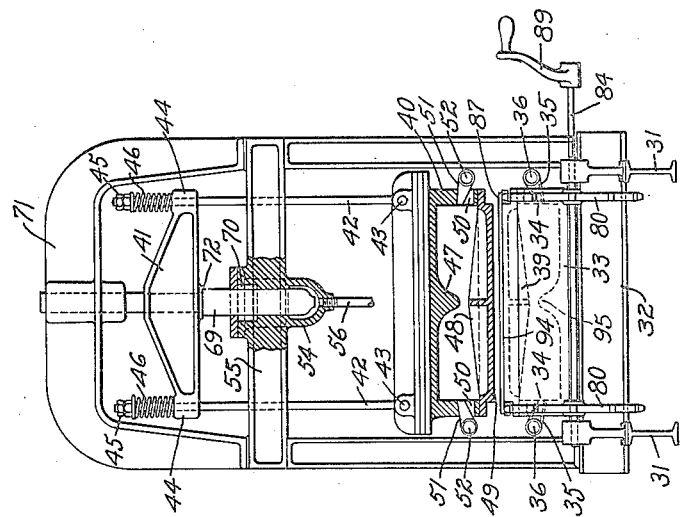

UNITED STATES PATENT OFFICE.

SAMUEL B. FIELD, OF HOLBROOK, MASSACHUSETTS, ASSIGNOR OF ONE-FOURTH TO PNEUMATIC SCALE CORPORATION, LIMITED, OF QUINCY, MASSACHUSETTS, A CORPORATION OF MAINE, AND THREE-FOURTHS TO WILLIAM H. DOBLE, OF QUINCY, MASSACHUSETTS.

PROCESS OF UNITING TOGETHER PLATES OF METAL BY SWEATING.

1,247,250. Specification of Letters Patent. Patented Nov. 20, 1917.

Application filed December 2, 1915. Serial No. 64,765.

*To all whom it may concern:*

Be it known that I, SAMUEL B. FIELD, a citizen of the United States, residing at Holbrook, county of Norfolk, State of Massachusetts, have invented a certain new and useful Improvement in Processes of Uniting Together Plates of Metal by Sweating, of which the following is a specification, reference being had therein to the accompanying drawings.

For some uses it is desired to unite together two or more sheets of metal superposed upon each other having flat faces which contact with each other in such manner that there shall be complete union over the entire contacting surfaces. It is practically impossible to unite the plates together by soldering in the ordinary way, so as to have a uniform cohesion and thickness of solder between the plates.

The object of the present invention is to provide a process of uniting together a plurality of plates by sweating, as it is termed, so that there shall be a uniform and complete surface union between the contacting flat faces.

In carrying out this process, the plates of metal are coated with a different metal of relatively low fusibility which is adhesive and cohesive when cool. This coating may be put on just before the plates are put through the process embodying my invention, or plates may be employed which have been previously coated, such for instance, as those which are commonly known as tinned steel or iron plates which are on the market and have a coating of substantially pure tin. These plates are assembled together with their faces in contact, first being fluxed, then they are heated to a sufficiently high temperature to bring the tin up to the degree of temperature where the tin is just ready to run without being so fluid that it will flow off from the sheet of metal, and then the assembled plates are allowed to cool under pressure until the fused facing has solidified.

It is important that the fusible coating shall be heated sufficiently to bring the fusible coating to the right condition, and that it shall be maintained in that condition until the assembled plates are placed in the cold press and the pressure is applied.

It is also found that during the transfer of the assembled plates to the press after they have been heated to bring the fusible coating to the fusion point, the temperature of the fusible coating becomes lowered somewhat, and the surface becomes partially oxidized by exposure to the air, oftentimes sufficiently to interfere with or prevent the adhesion of the plates after they have been introduced into the press.

If the plates have any dust or foreign matter on the surfaces which are to be united there will be places wherever these dust particles exist at which the plates will not be united. It is therefore, necessary that the plates should be thoroughly cleaned before they are heated and should be kept clean during the entire operation. It is found that even if they are cleaned when put into the heater, yet if the surfaces are left exposed to the atmosphere in the heater without any protective covering there are apt to be more or less foreign particles in the heater which adhere to the surface of the plates and prevent complete adhesion.

One object of the invention is to protect the assembled plates during the heating and during the transfer to the cold press after being heated so that the plates will retain the proper temperature after being heated until they have been introduced into the press and pressure is applied; another object is to prevent oxidation, and a third object is to prevent particles from coming in contact with the surface during the operation.

I accomplish this result by placing the assembled plates in a suitable envelop or covering before they are introduced into the heater, this covering being of suitable material which will not fuse at the temperature at which the fusible coating of the plates fuses but which will transmit heat to the inclosed plates and then transferring said envelop and inclosed plates to the cold press and applying the pressure while the assembled plates are still inclosed in said envelop. The envelop should be of such character that the pressure can be applied to the plates through the envelop, that is, the two opposite panels of the envelop should be movable toward and from each other so that they may be pressed toward each other into contact with the inclosed plates.

I find that the best results are obtained by heating the plates while in the envelop under pressure in a hot press which heats them sufficiently to fuse the fusible coating and then cooling them in a cool press.

In the drawings the invention is shown as applied to the uniting together of a plurality of plates for forming a panel of a box composed of an inner and an outer plate spaced apart from each other and having between them corrugated strengthening plates and having channel members for connection with adjacent panels.

The invention will be fully understood when taken in connection with the accompanying drawings and the novel features thereof will be pointed out and clearly defined in the claim at the close of this specification.

In the drawings,

Fig. 5 is a side elevation of one form of apparatus by which the process of uniting the plate is carried out.

Fig. 6 is a vertical sectional view through the hot press on line 6—6 of Fig. 5.

Fig. 7 is a vertical section through the cold press on line 7—7 of Fig. 5.

Fig. 8 is an enlarged sectional view showing the 4-way cock for controlling the inlet and outlet of the water to and from both the hot press and the cold press.

Figure 4:
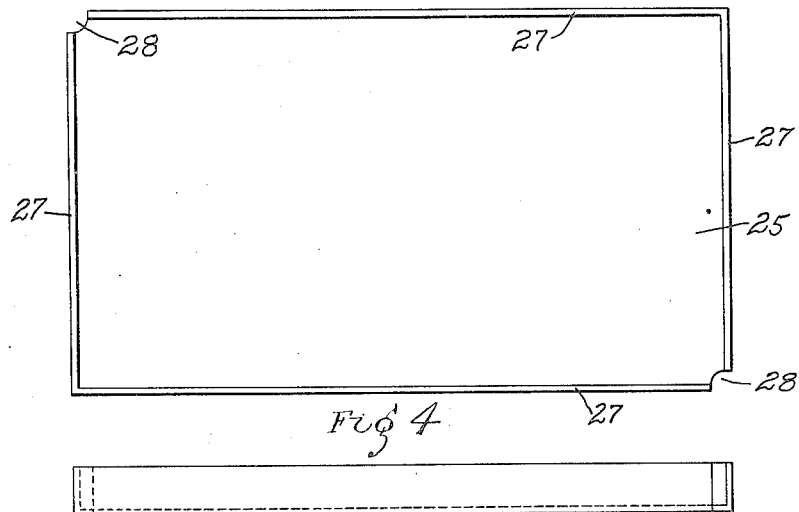
Fig. 4 is a plan view of the members of the envelop.

While in the drawings the invention is shown as applied to the uniting together of the inner and outer plates and the intermediate corrugated plate and the channel plates at the sides and the filling plates at the corners, it is to be understood that the process may be employed in uniting any plurality of plates, whether two or more.

Referring now to the drawings and specially having reference to Figs. 1, 2, 3, and 4 the two flat plates 11, 12 form the inner and outer walls of the panel, and 13 represents an intermediate corrugated plate having parallel flat portions which are adapted respectively to contact with the plates 11, 12 said parallel portions 15, 16 being connected by the transverse portions 17. Inserted at one edge of the panel between the plates 11, 12 is a channel plate 18 which forms a closure for the edge of the panel and is formed with a plurality of eyes 19 intended to receive a hinge pin to connect it with an adjacent panel. The two parallel flat faced legs of the channel member 18 contact with the two plates 11, 12.

The opposite edge of the panel is provided with a channel shaped closure plate 20 having two parallel flat legs which contact with the two plates 11, 12. The outer portion of the channel plates 20 is differently shaped from the eye portions 19 of the channel plate 18, but this is immaterial to the present invention. The two end edges of the panel are closed by channel plates 21, 22. At the four corners of the panel there are introduced angular filling plates 23 which enter the space between the legs of adjacent channel members. All of these plates and filling members are preferably of iron or steel and are formed with surface coatings of tin or other metal which is fusible at a relatively low temperature and has a high degree of cohesiveness and of adhesiveness to the metal of which the plates are composed.

The plates or various members of which the panel is to be composed after being assembled together are placed in a suitable envelop of metal or other heat transmitting character which substantially entirely incloses the assembled members of the panel. For convenience, the envelop preferably comprises two members 25, 26 which are adapted to shut on to each other and to embrace the assembled panel forming members between them. Instead of having these members 25, 26 telescope each other like the cover and body of a box in which the cover is usually of a little larger diameter than the box so as to shut down over the top of the box, both members are preferably exactly alike and of the same size so that any two of the envelop members may be used together without its being necessary to specially select each time a body member and a cover member.

Figure 3:
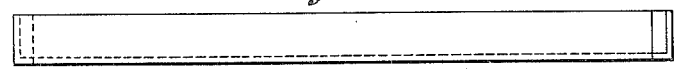
Fig. 3 is a side elevation of the envelop.
Figure 2:
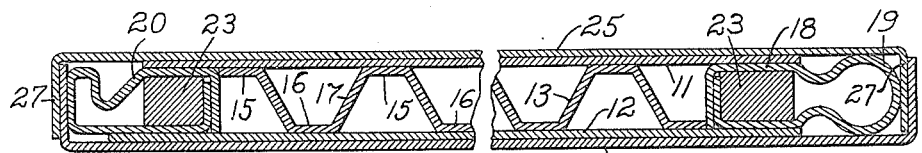
Fig. 2 is a cross sectional view showing the assembled plates in the envelop. This cross sectional view is taken on the line 2—2 of Fig. 1, except that in Fig. 1 the envelop is not shown.
Figure 1:
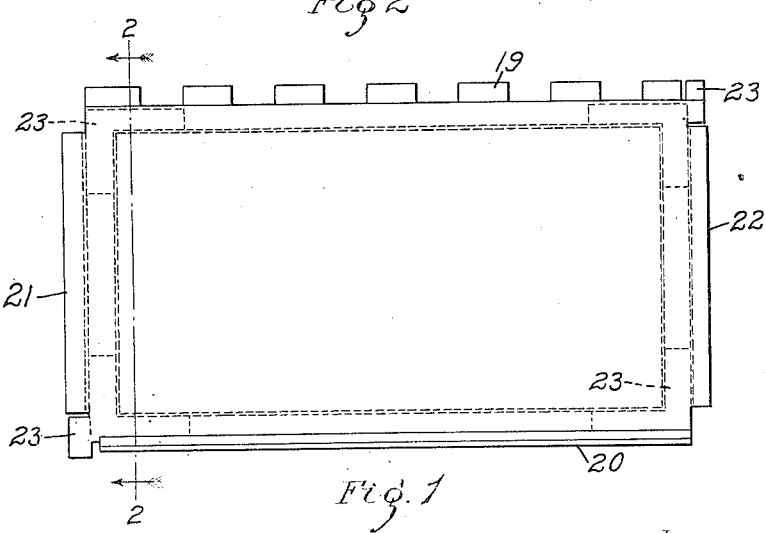
Figure 1 is a plan view showing the assembled plates in the envelop.

The form of construction of these envelop members is shown in Figs. 2, 3, and 4. Each envelop member is formed with a flange 27 at the sides and ends at right angles to the top or bottom, as the case may be, of the envelop member, and at each two diagonally opposite corners of the envelop member, a notch 28 is cut out of the face of the envelop member, and the flange 27 is also correspondingly shortened so that there will be an open space at both said corners as shown in Fig. 4. The envelop member 26 has notches 27 in corresponding corners as the member 25 but when the member 26 is inverted as it will be when the parts are assembled as in Fig. 2 the notches in the member 26 will come against the closed corners of the member 25. This enables the two members to be shut together as shown in Fig. 2, one end flange and one side flange portion 27 of the member 25 being on the outside of the flange of the member 26, and the other side and end flange portions of the member 25 being on the inside of the other side and end flange portions of the member 26. The flanges 27 should all be a little less in depth than the distance across from the outer face of the plate 11 to the outer face of the plate 12 so that when the parts are assembled as in Fig. 2 the inner face of the member 26 will be in contact with the outer face of the plate 12 and the inner face of the member 25 will be in contact with the outer face of the member 11. If the flange 27 were too deep it is obvious that it would be impossible for both of the envelop members 25, 26 to contact with the plates 11, 12.

One form of apparatus by which the process may be practised after the plates are inclosed in the envelop or wrapper is shown in Figs. 5 to 8 inclusive. With this form of apparatus the plates after being assembled and inclosed in the envelop as already described are placed upon a carrier by which they are carried to a hot press, comprising an upper and a lower presser member, the package of plates being delivered on to the top of the lower presser member and then the upper presser member is lowered to press on the top of the envelop and press it against the lower member. Said presser members are both heated by gas or other suitable means. In the form of apparatus shown the upper presser member is actuated by hydraulic pressure to lift the presser member when desired so that the envelop and inclosed plates may be free to be fed along another stage in the travel. The press is shown as made large enough so that three envelops with inclosed plates may be successively moved into position to be in the hot press at one time, but the exact number is immaterial, whether one or more, except for especial capacity to do work. The work however, may be done more rapidly by having space for several than if there is space for only one.

After the envelop and plates have passed the last position in the hot press, the next movement of the carrier transfers them to the cold press which consists of an upper and a lower member between which the envelop and plates are squeezed, the lower member being movable by hydraulic pressure to apply the pressure.

This apparatus will now be more particularly described. The hot press is shown as consisting of two parallel I-beams 31, which in turn support a series of parallel I-beams 32 arranged crosswise on the I-beams 31. Any suitable framing however, may be employed. On the top of the I-beams 32 is mounted the hollow lower presser member 33 of metal, somewhat box shaped, having a top, bottom, sides and ends, thus forming a chamber. The two sides of the box are formed with apertures 34 through which a series of gas burners 35 extend, said gas burners being arranged at intervals and connecting with a gas pipe 36, one on each of the two sides of the presser member, said gas pipes 36 each having suitable pipe connections with a gas supply pipe 37 in which there is a cock 38 which controls the gas to the pipes 36. The top 94 of the presser member 33 is flat so as to form a flat bed or platen to receive the assembled plates in the envelop. This presser member 33 is stationary.

It is preferably provided with baffling ribs 95, 39, the baffling rib 95 being on the bottom and extending lengthwise of the interior of the chamber and projecting upward, and the rib 39 being transversely of the top interior of the chamber and projecting down into the interior so that the ribs 95, 39 are at right angles to each other and in different plates. These ribs are for the purpose of deflecting the hot air as it is heated by the gas jets so as to heat all parts of the walls of the chamber, especially the top on which the envelop and plates are supported.

The box 40 which is preferably a counterpart of the box 33, but made in inverted form, is suspended from the head 41 by means of vertical rods 42 which at their lowermost ends are connected at 43 with a bracket secured to the top of the member 40, the upper ends of the said rods passing loosely through apertures in bosses 44 which form a part of the head 41, the upper ends of said rods extending some distance above said bosses and having at the upper ends nuts 45 between which and the bosses 44 are placed spiral springs 46, thus affording a yielding support for the box 40. The box 40 is formed with baffling ribs 47 and 48 similar to the baffling ribs 95, 39 of box 33. The bottom 49 of the box 40 is made flat in a plane parallel with the plane of the top face 37 of the lower box 33. It is formed with apertures 50 through which gas jets 51 extend from gas pipes 52 along two opposite sides and these gas pipes 52 have a flexible pipe connection 53 with a supply pipe 37, the flexible connection being for the purpose of allowing the rising and falling of the box 40.

Two hydraulic cylinders 54 are each mounted in the frame 55, each of said cylinders having a water inlet pipe 56, which enters the bottom of the cylinder and is connected with a pipe 57 which in turn is connected with a pipe 58. Said pipe 58 is connected by a valve 59 with an inlet supply pipe 60. An outlet pipe 61 also connects with said valve 59 opposite the inlet pipe 60, said pipe 58 leading into the valve 59, midway between the inlet pipe 60 and the outlet pipe 61, being at 90° from each of them. Said valve 59 is a four-way valve having the ripples 62, 63 and 64 with apertures through which the pipes 58, 60 and 61 connect with the valve and ripple 65, with which another pipe 66 connects with the valve, said pipe 66 leading from the cold press as will be hereinafter described. The passage through the valve is controlled by a four-way key 67 as clearly shown in Fig. 8. When the key is in the position shown in Fig. 8 the passage from the pipe 58 is open to the outlet pipe 61 by means of a connecting passage 68 so that any water in the cylinders 54 will run out, and the communication between the inlet pipe 60 and the pipe 58 is closed so that no water can run into the cylinder 54.

A ram or plunger 69 extends through a stuffing box 70 into the cylinder and has a stem which passes through an aperture in the head 41 and through the yoke 71 at the top of the frame. The ram 69 has a vertical movement and is formed with a shoulder 72 on which the head 41 rests so that the head 41 will be carried up when the ram 69 rises. The yokes 71 for both rams are connected rigidly together by a cross tie 93.

When the water is shut off from the cylinder 54 the ram 69, head 41, and presser member 40 will descend by gravity to their lowermost position, and this downward pressure is sufficient for the purpose required in pressing the assembled envelop and plates against the lower box 33. When it is desired to lift the presser member 40 the key 67 will be turned one quarter turn, in the direction to bring the passage 68 of the key to connect the outlet pipe 61 with the pipe 66 leading to the cold press, and will cause the passage 73 to connect the inlet pipe 60 with the pipe 58, thereby admitting water to the cylinders 54 which will cause the ram 69 to rise and therefore to lift the head 41 and the presser member 40.

Adjacent one end of the hot press is the cold press which comprises a stationary upper member 74 and a vertically movable lower member 75, the lower face 76 of the upper member and the upper face of the lower member being flat and parallel with each other. The top face 77 of the movable lower member 75 of the cold press is preferably on the same level as the top face 37 of the stationary lower member 33 of the hot press when the lower member 75 of the cold press is in its uppermost position.

The lower member 75 of the cold press has secured on its under side a downwardly extending plunger or ram 78 which extends down into the cylinder 79, the lower end of said cylinder 79 having an aperture into which is fed one end of the pipe 66 leading to the valve 59. When the water is shut off from the cylinder 79, the weight of the ram 78 and of the presser member 75 with which it is connected will cause said presser member to remain in its lowermost position and at some distance below the upper presser member 74. When the key 67 is in position shown in Fig. 8 so that the water is emptied from the cylinder 54 of the hot press, water will be admitted from the inlet 60 through the passage 73 and pipe 66 to the cylinder 71, thereby applying pressure to raise the lower member 75 of the cold press. Thus, since the hot press is operative when the water is shut off from cylinders 54, and the cold press is operative when the water is admitted to the cylinder 79, the hot press and the cold press are rendered operative simultaneously by means of the same inlet pipe and valve.

The means for feeding the envelop and the assembled plates through the apparatus is as follows: Two endless chains 80 on opposite sides of the machine run respectively over two sets of sprocket wheels 81, 82 and 83, the sprocket wheels 81 being mounted on opposite ends of a shaft 84, the wheels 82 being mounted on opposite ends of a shaft 85, and the sprocket wheels 83 being mounted on opposite ends of the shaft 86. The two shafts 84, 85 are at the same elevation, so that the upper rim of the chain will be in a horizontal plane and the run will be on about the same level as the upper face 94 of the lower member of the hot press and the top face 77 of the lower member of the cold press when the lower cold press member is in its lowermost position. The length of the shafts 84, 85 is such that each pair of sprocket wheels will be spaced apart from each other sufficiently so that the two sprocket chains will run along just outside of the two side edges of the press members.

Extending crosswise from one sprocket chain to the other and secured thereon are a series of bars 87 arranged at intervals apart from each other, said intervals being each at least equal to the width of one of the envelops which hold the plates which are to be united. The rear sprocket wheels 81 are at some distance behind the rear end of the hot press, and between said sprocket wheels 81 and the rear end of said hot press is a table 88 whose upper surface is on a level with the upper surface of the lower member 33 of the hot press. The operator places one of the envelops containing the assembled plates on top of the table 88 in front of one of the bars 87 carried by the sprocket chains during one of the intervals while the sprocket chain is at rest, and while the press is open. The carrier chain is then started and moved for a distance equal to the space between two of said bars 87, and the bar 87 just behind serves as a push bar to engage the rear end of the envelop and push the envelop with the inclosed plates forward from the table 88 onto the top of the lower member 33 of the hot presser member. The operator will then turn the cock 67 to drain the water from the cylinders 54 so that the upper hot presser member 40 is allowed to drop and press the envelop and contents against the lower presser member 33. The press will remain closed for such time as is deemed necessary and then the press will be opened by turning the cock to admit water to the hot press cylinders and drain the water from the cold press cylinders and the carrier will then be moved along another stage of movement, carrying the envelop from the first station to the second station and depositing at the first station in the hot press another envelop which the operator will, in the meantime, have placed on the table 88. After the requisite interval the carrier will be moved as before and each of the two envelops already introduced will be moved to the second and third stations respectively, and a third envelop will be moved to the first station. At the next period of movement the envelop which is at the third station in the hot press will be carried to the cold press and a fourth envelop will be moved to the first station in the hot press, and thereafter at each period of movement of the carrier the package at the third station of the hot press will be moved to the cold press, and each of the other packages in the hot press will be moved forward one step and a fresh package will be delivered to the first station in the hot press. It will thus be seen that as there are three stations in the hot press each package will remain in the hot press three times as long as in the cold press. It is found by experience that less time is required for cooling the plates sufficiently in the cold press than for the heating of them in the hot press, and therefore it is preferable for rapid work to have several stations in the hot press so that a set of plates may be completely united and discharged from the cold press at each period of movement of the carrier.

In the apparatus shown on the drawings, the carrier is shown as being operated by a crank 89 on the shaft 84 of the sprocket 81, which can be turned at will by the operator. Any suitable means, however, may be employed, either manual or automatic.

The stationary upper member 74 of the cold press is mounted on a suitable frame 90 mounted on I-beams 91.

The assembled plates and envelop after passing from the cold press are delivered by the carrier onto a platform 92 from which they may be removed in any suitable way.

Preferably before the plates which are to be united are assembled and put into the envelop they should be dipped in some fluxing preparation to insure a clean surface and to aid in fusing the tin or other facing. While gas burners have been shown as the heating means it is obvious that other heating mechanism may be employed and still be within the scope of the invention.

It is also obvious that other forms of press and other methods of heating may be employed, those shown in the drawings being merely illustrative of one means.

I use the term "solder" in the broad sense, meaning thereby any suitable material which is fusible at a relatively low temperature and which when it solidifies by cooling will unite the two plates together. In this sense I consider pure tin as soldering material whether used alone or with the separate application of another preparation or flux.

The envelop may be of any suitable material which will transmit heat to the plates which are to be united and to which the solder will not adhere, whether the material of the envelop is naturally non-adhesive to the solder or whether made so by a suitable wash or facing.

It is also to be understood that the particular form of the envelop or wrapper is immaterial so long as it permits the transmission of pressure from the press through the envelop or wrapper to the inclosed plates.

What I claim is:

The process of uniting together plates of metal each having a coating of soldering material, said process consisting of enveloping said plates in assembled relation in a metallic wrapper which completely incloses said plates, said wrapper having a portion which contacts with the entire lower face of the bottom plate and another portion which contacts with the entire upper face of the upper plate, pressing the envelop and inclosed plates between two hot pressure surfaces which contact respectively with the entire upper face and the entire lower face of the wrapper, heating both pressure surfaces to a sufficiently high temperature to transmit heat through said envelop to the inclosed plates sufficient to fuse the solder while the said plates are under pressure between said pressure surfaces, then transferring the wrapper and plates from between the heated pressure surfaces while the plates are still completely inclosed in the wrapper and subjecting them while still thus enveloped to pressure between two cold pressure surfaces.

In testimony whereof I affix my signature, in presence of two witnesses.

SAMUEL B. FIELD.

Witnesses:
WILLIAM A. COPELAND,
ALICE H. MORRISON.